(No Model.) 6 Sheets—Sheet 1.
R. H. MORROW.
CORN HARVESTER.
No. 347,301. Patented Aug. 10, 1886.
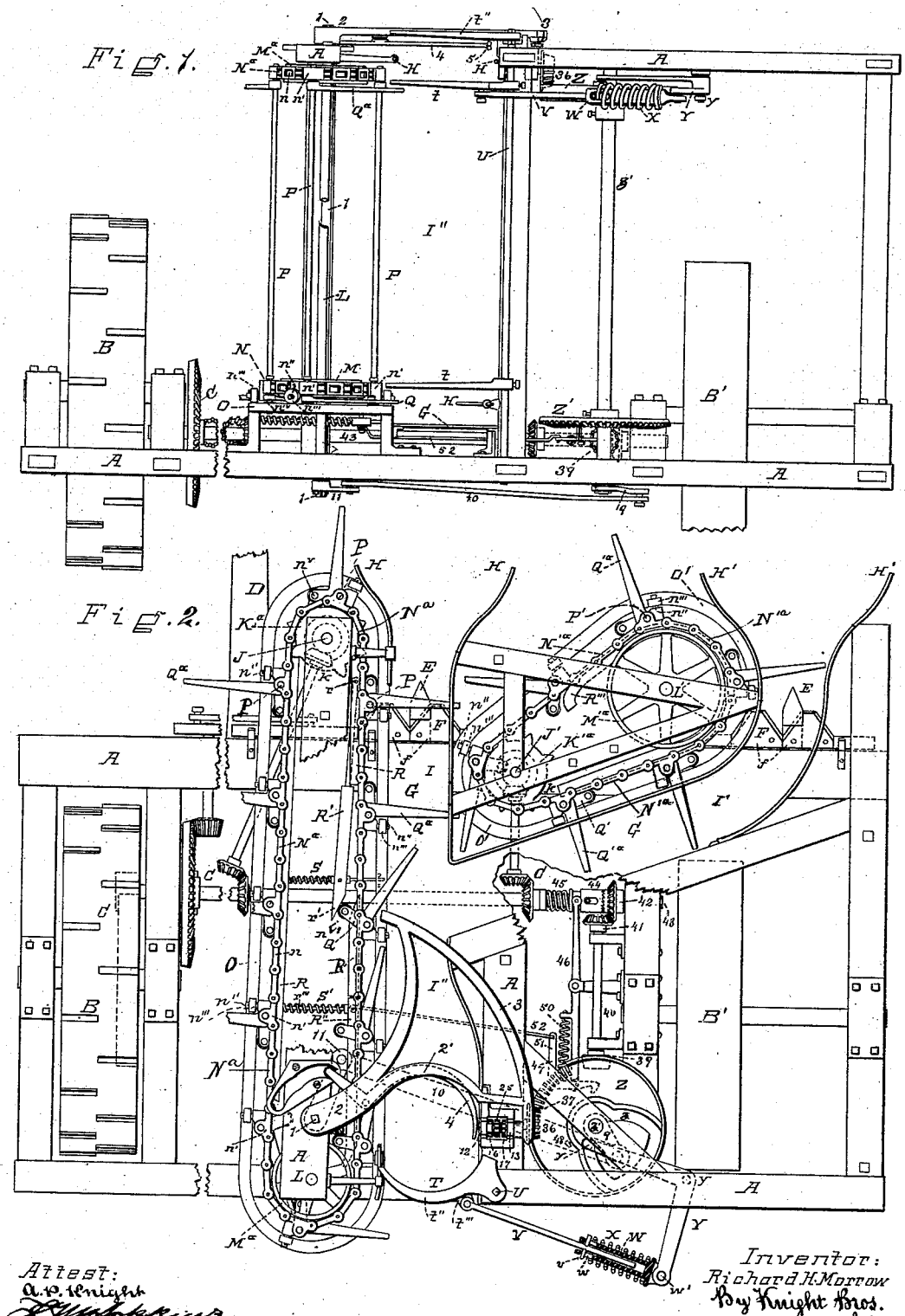
Attest:
Inventor:
Richard H. Morrow
By Knight Bros.
Attys

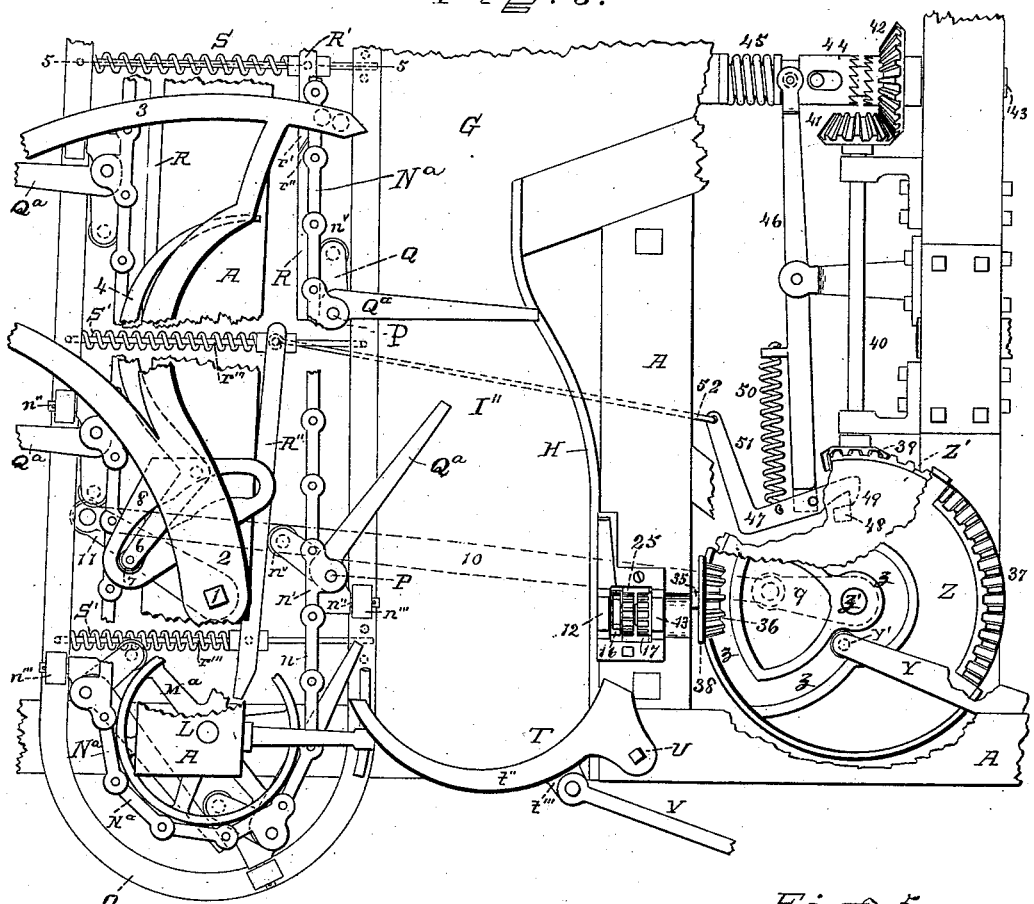

(No Model.)

R. H. MORROW.
CORN HARVESTER.

No. 347,301.

6 Sheets—Sheet 3.

Patented Aug. 10, 1886.

Attest:
A. P. Knight
J. M. Hopkins

Inventor:
Richard H. Morrow
By Knight Bros.
Attys.

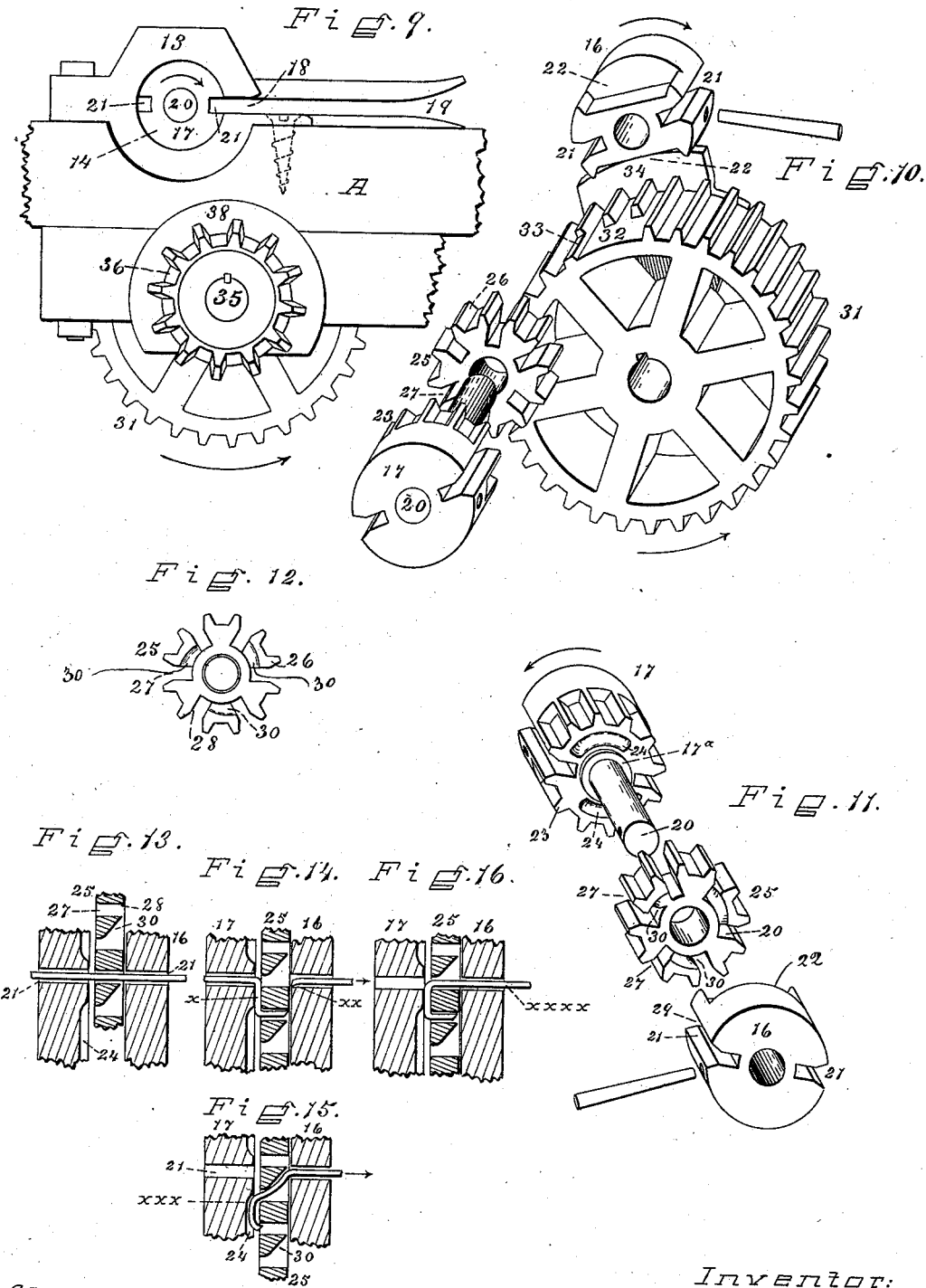

(No Model.) 6 Sheets—Sheet 5.

R. H. MORROW.
CORN HARVESTER.

No. 347,301. Patented Aug. 10, 1886.

Attest
A. P. Knight
[signature]

Inventor:
Richard H. Morrow
By Knight Bros.
Attys.

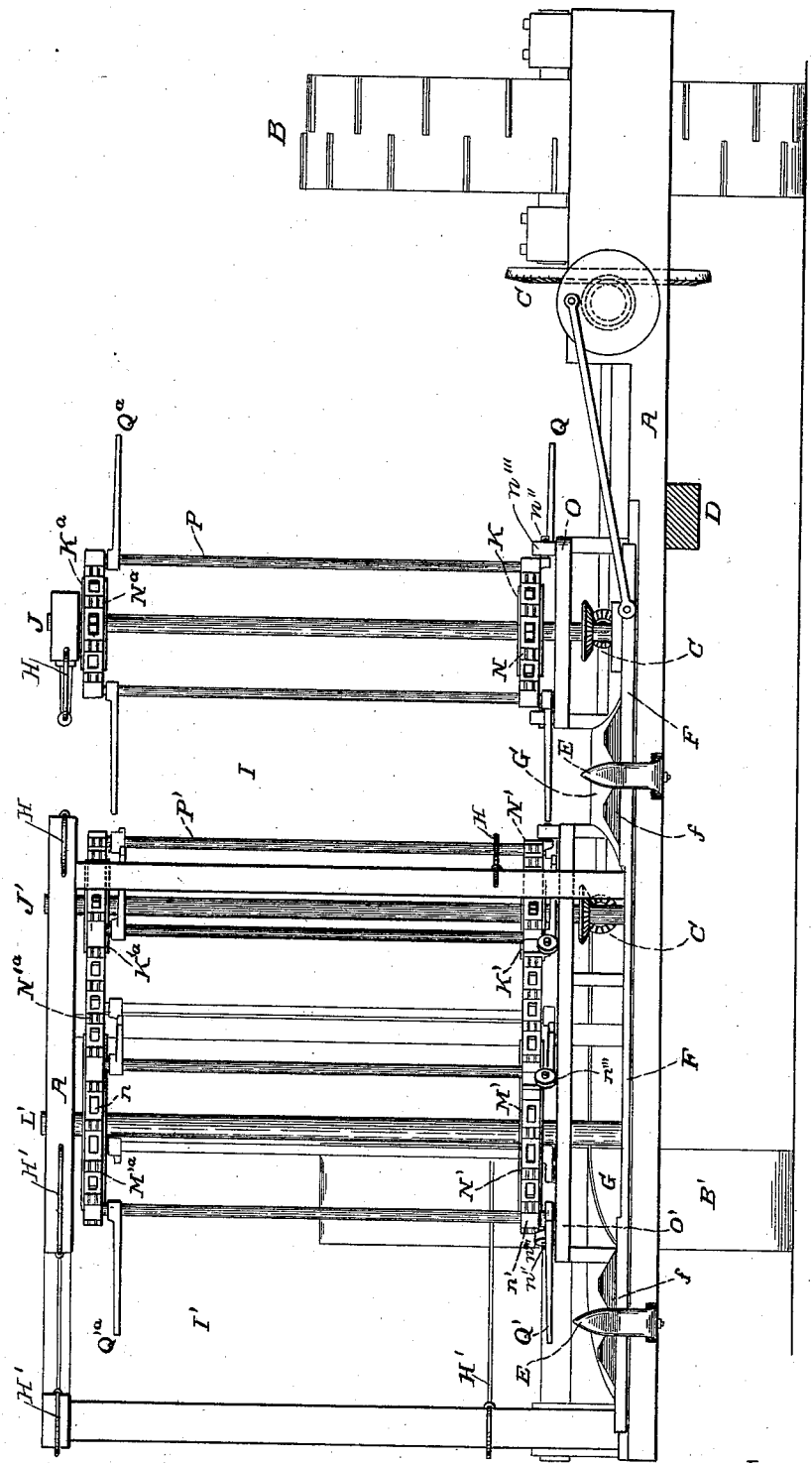

UNITED STATES PATENT OFFICE.

RICHARD H. MORROW, OF WASHINGTON COURT-HOUSE, ASSIGNOR OF ONE-HALF TO JAMES MORROW, OF STEUBENVILLE, OHIO.

CORN-HARVESTER.

SPECIFICATION forming part of Letters Patent No. 347,301, dated August 10, 1886.

Application filed July 31, 1885. Serial No. 173,158. (No model.)

*To all whom it may concern:*

Be it known that I, RICHARD H. MORROW, of Washington Court-House, Fayette county, Ohio, have invented a new and useful Improvement in Corn-Harvesters, of which the following is a specification.

My invention relates to a machine for the automatic reaping and bundling of such woody and semi-woody crops as Indian corn, sugar-cane, and so forth.

Figure 7:
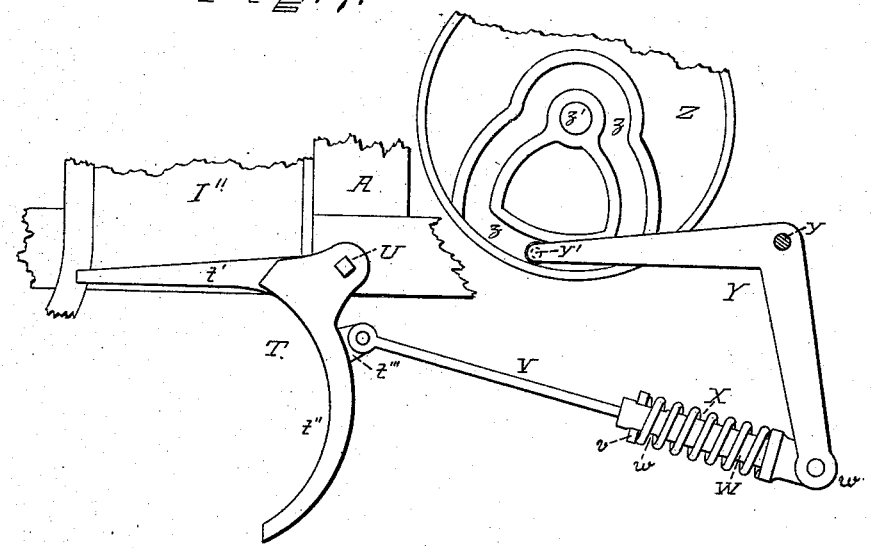
Figure 8:
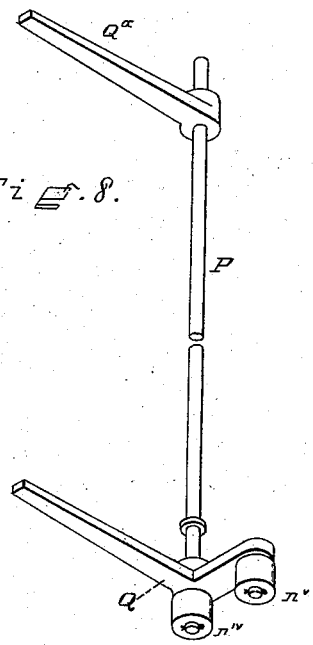
Figure 17:
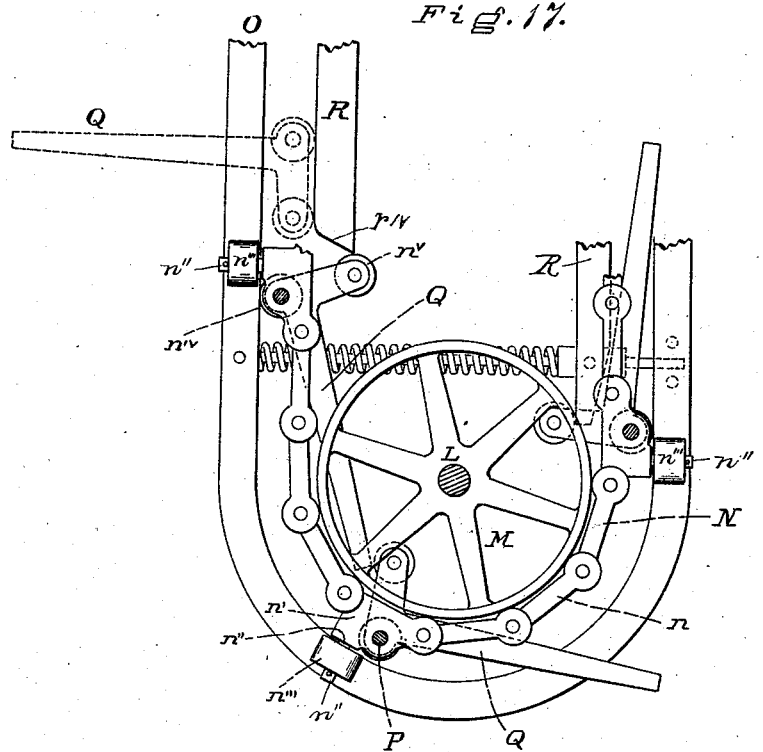

In the accompanying drawings, Figure 1 is a rear elevation, and Fig. 2 is a plan, of a corn-harvester embodying my invention, the parts being at that stage of the operation immediately preceding the discharge of a bound bundle. For compactness of representation a portion of the main frame is omitted from both figures. Fig. 3 is a plan of the knotting and bundling devices in the stage of operation immediately preceding closure of the needle. Fig. 4 is a perspective view of the needle, viewed from below. Fig. 5 is a vertical section of the track and the lateral guide on the line 5 5, Fig. 3. Fig. 6 is a vertical transverse section of the finger-bar and sickle. Fig. 7 is a plan of the cradle in its open position. Fig. 8 is a perspective view of a pair of the conveyer-fingers. Fig. 9 is an end elevation of the knotter mechanism. Figs. 10 and 11 are perspective representations of details of the knotter mechanism detached. Fig. 12 is an end view of the gripping and severing pinion. Figs. 13, 14, 15, and 16 are longitudinal sections through parts of the knotter mechanism, showing its action upon the binding-wire at successive stages of the operation. Fig. 17 is a top view of the rear portion of the lower sprocket-chain of the main conduit, with its carrying-wheel and guide. Fig. 18 is a front view of the machine.

I have illustrated my invention by a machine designed to cut two rows of corn at a time; but it is evident that the principle is applicable to the cutting of a single row at a time, or even of a greater number of rows than two.

A represents a frame supported on two ground-wheels, B B', of which one wheel, B, is connected by means of suitable transmitting mechanism, C, with the operative parts. The connection of said wheel with its transmitting mechanism is preferably made through customary pawl and ratchet, (not here shown,) in order that the machine shall be operative as a harvester in its forward movements only. A customary clutch-connection (not here shown) is also preferably added, to enable optional disconnection of the operative parts from the said wheel.

D represents a portion of the tongue to which the team is hitched.

E are sickle guides or fingers pitched obliquely upward at an angle of about thirty degrees with the horizon, and containing the correspondingly-pitched sickle-bar F, which has as many sets or groups of knives *f* as there are rows to be cut—in the present illustration, two. The upward pitch of the sickle bar enables it to more readily sever the stalks. Immediately in rear of the sickle-bar is a platform, G, of the peculiar form shown.

Attached to the frame, immediately in front of the two sets of sickle-knives, are flaring gatherers H H', that, being prolonged rearward, constitute two inlets, I I', to the main passage I'', that conducts direct to the place of binding. These several parts constitute my Y-formed conduit I I' I''.

Journaled in the frame, near the respective conduits, are two pairs of vertical shafts, of which one shaft, J or J', in each pair has two toothed driving pulleys or sprockets, K K$^a$ K' K'$^a$, and of which the other shaft, L or L', in each pair has two plain pulleys, M M$^a$ M' M'$^a$. Engaged around these pulleys are two pairs of endless chains, N N$^a$ N' N'$^a$, of which each chain is composed, in regular succession, of groups of two or more open links, *n*, which engage over the sprocket-teeth and of interposed solid links, *n'*. Three or more open links are preferably interposed between every two consecutive solid links. (See Figs. 2, 3, and 18.) Each solid link of the lower chain, N or N', has projecting horizontally from it a stud, *n''*, which carries a roller, *n'''*, which rests upon and is guided by a track, O or O'. The corresponding solid links of the upper and lower chains of each pair are united at regular intervals by and constitute journal-bearings for vertical shafts P P', of which each carries near the lower chain a firmly-attached L-formed finger, Q or Q', and near the upper chain a finger, Q² or Q'².

Each shaft P or P' has immediately below its L-formed finger an anti-friction roller, $n^{iv}$, and each L-formed finger has at the extremity of its short limb an anti-friction roller, $n^v$.

In order to permit easy passage of the solid links $n'$, those parts of the sprockets which in rotation come in contact with said solid links are blank or toothless, as shown at $k$.

R is a fixed and R' R'' are yielding sections of lateral guides for the rollers $n^v$ on the extremities of the short limbs of the L-formed fingers Q of the main conduit I I''.

R''' is a fixed lateral guide for the L-formed fingers Q' of the branch conduit I'.

The yielding section R' has its front end pivoted, as at $r$, to the frame, its obliquely-formed rear extremity, $r'$, being pressed by spring S against the corresponding oblique portion, $r''$, of the fixed section R.

The purpose of the partially-yielding section R' is as follows: Accumulation of material in front of the closed needle exerts a back-pressure against the long limb of an approaching L-formed finger, whose short limb is thus caused to press open the rear or yielding end of the section R', and to permit passage through the opening $n^{vi}$ thus made of the roller $n^v$ on the said short limb, causing the finger itself to fold up against or under the chain conveyer and to permit continued progress thereof unimpeded by the closely-packed mass of stalks. The finger having been once thus folded, remains so until its escape from the material, and resumes its rigidly-projecting condition as its roller is deflected and returned to the outer wall of the guide R at the return-run of the chain by the impact against it of the beveled extremity $r^{iv}$ of said guide, as shown in Fig. 17. Each succeeding finger, so long as the needle remains closed, undergoes the same folding action. Retrograde stroke of the needle removing the impediment to the material, the opening $n^{vi}$ closes, after which all the fingers retain the projecting position with which they enter the conduit, the above-described automatic folding action of the fingers being resumed on reclosure by the needle.

The section R'' is capable of yielding bodily on lateral guides $r'''$, and is retained normally in continuity of the fixed sections by means of springs S'.

The bodily-yielding section R'' has two uses—namely, first, to permit partial deflection of the conveyer-fingers in crowding past a nearly-charged cradle, and, secondly, to permit a greater finger-deflection and correspondingly greater yield of the section in the presence of a fully-charged cradle as part of the instrumentalities for starting the binder mechanism, as hereinafter explained.

The rear extremity or outlet of the Y-formed conduit is temporarily closed by a crib or cradle, T, which is capable of partial rotation about a vertical shaft, U, and which consists of three or more prongs, of which the lower prongs consist of a curved limb, $t$, which extends athwart the outlet, and in which the stalks collect and are held for binding, and a straight limb, $t'$, which extends forward and to one side of the conduit, and which, on the rearward swing of the cradle, operates to assist in discharging the bound bundle. The uppermost prong, $t''$, of said cradle is identical in shape with the lower ones, except in possessing no straight limb. Its office is to support the rear side of the bundle against the pressure of the compressor-arm of the needle and to coact with said arm in bringing the gavel to proper shape and thickness for binding. An eye, $t'''$, on the next to the top prong of the cradle has bolted to it a rod, V, whose unattached end occupies a sheath, W, provided with a spiral spring, X, and whose slot $w$ is occupied by a pin, $v$, on the rod V, to enable retraction of the cradle at the proper moment. The spring X permits a slight yield of the cradle in event of excessive crowding of material between it and the compressor-arm. The sheath W is pivoted at $w'$ to one extremity of a bell-crank, Y, pivoted to the frame at $y$, and whose other extremity has a downturned wrist, $y'$, which occupies a cam-groove, $z$, in an upper wheel, Z, that is alternately rotated and brought to rest, in a manner to be presently explained.

Z' is a lower wheel, and both the wheels Z Z' are keyed fast to a vertical shaft, $z'$.

In the position of the parts shown in Fig. 3 the wheels Z Z', being at rest, operate to hold the cradle firmly to the place indicated in said figure, being that suitable for receiving and holding for the action of the binding-needle a charge of stalks sufficient for a bundle, and the shape of the cam-groove $z$ is such as not to disturb that condition, even after commencement of motion of the wheels Z Z', until the proper moment for discharge of a bound bundle. Such discharge is accomplished by the backward swing of the cradle described in the sequel.

A vertical shaft, 1, journaled in the frame, has rigidly attached to it the shank 2 of needle 3, whose curve is concentric with said shaft. The portion 2' of the needle-shank is curved concavely, so that when the needle is closed, as shown in Fig. 2, an approximately circular space is inclosed between said portion 2' and the outer compressor-arm, $t''$. This portion 2' of the needle-shank constitutes a compressor-arm. Extending from and pivoted to the shank 2 is a tucker-arm, 4, which is curved like the curve 2' of the needle 3, and has at its extremity a notch, 5, to engage with the binding-wire. The heel 6 of said arm has a wrist, 7, which occupies and traverses a slotted bracket, 8, having the represented form, whereby as the needle proper approximates its closed position the said notched end 5 of the arm is made to advance more rapidly than the needle itself, so as to engage with the binding-wire and to push or tuck said wire against the gavel and into engagement with the twister. The forms and dimensions of these parts are such that the end of needle 3 and the compressor-arm 4 in their closed position inclose between their ends the twister mechanism about to be described.

The needle 3 and the twister mechanism are synchronously operated by suitable connection with the wheel Z'. The needle-connection consists of a crank, 9, on the shaft of said wheel, that is coupled by rod 10 with crank-arm 11 on said needle-shaft, whose radial length sufficiently exceeds that of said crank as for each crank-rotation to produce the desired sweep of the needle.

The twister mechanism is constructed as follows: Bolted firmly upon the frame are two yokes, 12 13, whose circular orifices 14 receive the cylindrical collars 16 17 of the twister proper, to which the said yokes serve as journal-bearings. The said yokes have on their front sides gates or inlets 18 19, to admit the binding-wire, first in the closing and afterward in the opening action of the needle. The said collars 16 17, being both rigidly fastened to a shaft, 20, revolve and stop simultaneously, and both have diametrically-opposite gates or notches 21, that are capable of being brought into coincidence with the yoke-inlets 18 19. The intervening unnotched portions of the collar 16 have flattened depressions 22, to enable arrest of rotation of both collars for severing the wire between the gavel and needle, gripping the end of the wire which remains connected to the needle, and releasing the end previously so gripped. The portion of the periphery of the collar 17 nearest to the collar 16 is so indented as to produce a series of cogs, 23, twelve in number. The inner face of said collar 17 has a boss, 17ª, which holds the loose pinion (to be presently described) sufficiently aloof to grip, without cutting, that portion of the wire which, after the severing action, remains connected with the needle. Said face has also two diametrically-opposite depressions, 24, to facilitate escape at the proper moment of the thus-gripped wire. Revolving loosely on shaft 20, between the collars 16 and 17, is a pinion, 25, having the cogs 26, corresponding to those of the collar 17, and having between the pairs of said cogs a gate or indentation, 27, like the gates 21. In order to insure severing of the wire, the pinion 25 revolves in close juxtaposition to the collar 16, and with the same object in view one salient angle, 28, of each alternate cog of said pinion is sharp, so that it will coact with the opposite angle, 29, of the said collar for severance of the wire between the gavel and the needle. The intermediate angles of said pinion are chamfered, as at 30, to permit the previously-gripped end of the wire to escape simultaneously with the severance of the wire between the gavel and the needle, so as to completely release the bound bundle and permit of its discharge. So journaled in the frame, and of such breadth as to gear with both collar 17 and pinion 25, is a spur-wheel, 31, of thirty-two cogs. The number of said cogs may, however, be increased by twelve or some multiple of twelve. These cogs on the side of said spur-wheel that gears with the pinion 25 are complete; but on the side which gears with the collar 17 two consecutive cogs are obliterated, so as to leave a vacant space, 32, and adjoining said space one cog, 33, is truncated. Opposite the same space the said spur-wheel has a wing, 34, whose engagement in one of the depressions 22 of the collar 16 operates to arrest rotation of both collars while the pinion 25 is driven through an arc corresponding to two teeth, or one-sixth of its circumference. This movement of the pinion 25 relatively to the collars 16 17 operates to grip and hold that part of the wire (see $x$, Figs. 13 and 14) which is connected with the needle, and also operates to sever that part of it (see $x\ x$, Fig. 14) that is connected with the bound bundle, and to simultaneously release the previously-pinched end, now on the opposite side of the twister, such release being facilitated (see $x\ x\ x$, Fig. 15) by the depressions 24 in the collar 17 and the chamfers 30 in the pinion 25. Finally, the needle, in retreating, pulls the wire from position $x$, Fig. 14, to the place just vacated by the bundle-wire. (See $x\ x\ x\ x$, Fig. 16.)

It is apparent that each revolution of the spur-wheel 31 is accompanied by two and a half revolutions of the collars 16 17 and by two and two thirds revolutions of the pinion 25. By increasing, as above mentioned, the number of cogs in the spur-wheel, the number of revolutions of said collars and pinion may be increased by any whole number, according to the twist to be given to the wire.

The resquisite intermittent revolution of wheel 31 is secured by the following means: The shaft 35 of said wheel carries also a bevel-wheel, 36, which meshes in a segment-rack, 37, on the crown of the wheel Z, and which occupies about one-sixth of its circuit. The number of cogs in said rack correspond with those on said bevel-wheel; but its two end cogs are sufficiently truncated to restrict said wheel to one complete rotation at any one time. A segment-flange, 38, on said shaft 35, by bearing with its flat edge against the flat crown of wheel Z, prevents rotation of the bevel-wheel 36 and its attached wheel 31, except when said bevel-wheel is in mesh with said segment-rack 37.

The rotation of the wheels Z Z' is also intermittent, and is effected by the following means: The under side of the wheel Z' is cogged around its entire circuit, constituting a bevel-wheel, which meshes in a bevel-pinion, 39, on a shaft, 40, whose opposite end has a bevel-pinion, 41, that meshes in a bevel-pinion, 42, which revolves loosely on a shaft, 43, that forms part of the transmitting mechanism. Revolving with and slidable upon the shaft 43 is a clutch, 44, whose spring 45 tends to press it into engagement with the bevel-pinion 42, so as, at the proper juncture, to communicate the rotative movement of the transmitting mechanism to said pinion, and thence to the wheels Z Z'. Connected to the clutch 44 is a lever, 46, to whose rear end is pivoted a trigger, 47, against which, at a certain part of the rotation of the wheel Z', impinges a tappet or projection, 48, upon the said wheel. The impingement of said tappet against said trigger, by vibrating the lever, operates to unclutch the bevel-pinion 42, so as to again reduce to rest both said pinion and its driven members, including the wheels Z Z', and to cause a temporary suspension of all the functions of said wheels, including that of moving the needle. The parts are so arranged that this takes place when the needle has reached its most open position. (See Fig. 3.) The details of this stopping and starting or tripper mechanism are shown in Figs. 2 and 3, in which the preferable L form of trigger 47 is shown, the said trigger being held normally to the position for engagement of the tappet 48 against its lip 49 by means of a spring, 50. The short arm 51 of the said trigger is connected with the yielding section R'' of the guide R R' R'' by means of a rod, 52. This connection forms part of the instrumentalities whereby, at the proper juncture, the various functions dependent on rotation of the wheels Z Z' are resumed. This action of the said connection will now be explained.

When stalks in sufficient quantity for a bundle have accumulated against the cradle, their back-pressure, operating through the L-formed fingers, forces away from the conduit the guide-section R''. (See Fig. 3.) This motion being communicated through the rod 52, operates to trip the trigger 47, so as to permit re-engagement of the clutch 44, and consequent resumption of rotation of the wheels Z Z', and to produce in rapid succession the closure of the needle and compressor-arm 3 and tucker 4, the engagement of a new portion of wire within the twister, the latter's rotation, so as to twist the two strands of wire upon each other, the gripping of the needle end of the wire and severance therefrom of the end which connects with the bundle, the simultaneous release of the previously-gripped portion, the discharge of the bound bundle by momentary retraction of the cradle, the return of said cradle to the closed condition and the retraction of the needle, so as to bring an additional length of wire into service for the ensuing bundle, and to enable the L-formed and their associated fingers to maintain their projecting position, and to effectively sweep back and pack, stalk by stalk, the material entering the gatherers.

Retraction of the cradle (for discharge of the bound bundle) and its return to normal position is brought about by the action on the wrist $y'$ of the cam-groove $z$ of the wheel Z. This groove is seen to consist of two concentric arcs of unequal radii with uniting portions, making a complete circuit.

The location of the tappet 48 on the wheel Z' is such as, when the needle has reached its extreme retraction, to re-engage the trigger 47, so as to disconnect the binding apparatus from the driving mechanism, and to reduce the operation to the simple act of accumulating material for the ensuing bundle.

Any customary or approved device may be employed for taking up the slack of the wire, which is produced during the closing stroke of the needle.

I have described the preferred number of cogs, fingers, &c.; but the same may be varied at discretion, so long as the same relative motions are secured. For example, the rotations of the twister, instead of being two and a half, may be three and a half or four and a half, according to the number of twists to be given to the wire, but must always be some whole number plus one-half.

The described upslant of the sickle-bar enables it to more easily sever the stalks than if it cut them at right angles to their length.

I claim as new and of my invention—

1. In a corn-harvester, the combination of the following elements, to wit: the conduit I I'', whose lateral guide R has the yielding sections R' R'', and the endless conveyer composed of chains N N', driven from one of the ground-wheels, and having the fingers Q Q$^a$, as and for the purpose set forth.

2. In a corn-harvester, the combination, with endless chain N, driven from one of the ground-wheels, and having the series of L-formed pivoted fingers Q, of the partially-yielding guide-section R', as and for the purposes explained.

3. In a corn-harvester, the conveyer-chain N, in which, alternating with one or more open links, are closed links, each having a stud projection, $n''$, for a supporting-roller, $n'''$, and each constituting the journal-bearing of a vertical shaft, P, carrying a conveyer-finger, Q, as set forth.

4. In a corn-harvester, the combination, with continuous tracks O, and with sprocket and carrier wheels K K$^a$ M M$^a$, of a pair of conveyer-chains, N N$^a$, of which each has a series of equidistant links, $n'$, each of said links in the lower chain having a horizontal stud, $n''$, for a supporting-roller, $n'''$, and being connected to the corresponding link in the upper chain by a vertical shaft, P, which carries an L-formed finger, Q, near the lower chain, and a plain finger, Q$^a$, near the upper chain, as and for the purpose designated.

5. In a wire-binding corn-harvester, the twister mechanism composed of the gated journal-bearings 12 13, the gated cylindrical collars 16 17 of the shaft 20, the collar 16 having peripheral depressions 22, and the collar 17 having cogs 23 and face-depressions 24, said shaft carrying between said collars the loosely-revolving cogged, gated, and chamfered pinion 25, said collars and pinion being combined with the intermittingly-rotated spur-wheel 31, having the vacant space 32, and the wing 34, substantially as and for the purposes set forth.

6. The combination, in a corn-harvester, with the intermittingly-rotated wheels Z Z', having the tappet 48, of the train of driving-gears 38 39 41 42, the spring-clutch 44 on a shaft of the transmitting mechanism, the lever 46, pivoted on the frame, carrying the trigger 47, and the rod 52, extending from said trigger to the yielding guide-section R'', substantially as and for the purpose set forth.

7. In a corn-harvester, in combination with compressor-arm 2' and with the cam-grooved wheel Z, and yielding connection V W X Y, the swinging and yielding cradle T at the outlet of the main conduit, having three or more prongs, of which the lower ones have a curved portion, $t$, for support and a straight portion, $t'$, for discharge of the bundle, and of which the uppermost prong, $t''$, consists of a curved portion only, and is on a level with and coacts with the compressor-arm 4 to compress the bundle preparatory to and during binding, as set forth.

In testimony of which invention I have hereunto set my hand.

RICHARD H. MORROW.

Witnesses:
GEO. H. KNIGHT,
JAS. R. FORAKER.